Figure 1:
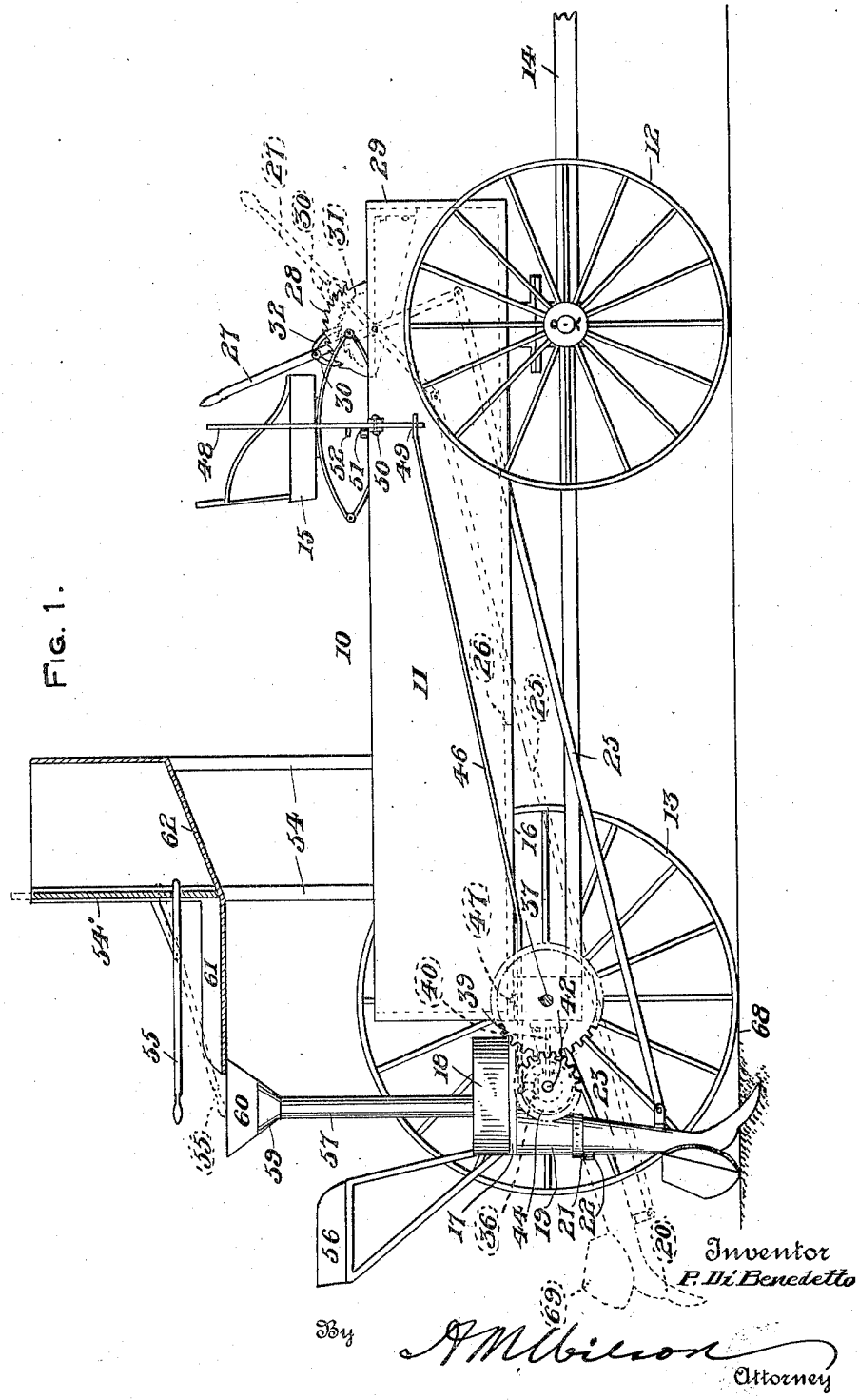

P. DI BENEDETTO.
POTATO PLANTER.
APPLICATION FILED AUG. 8, 1917.

1,275,645.

Patented Aug. 13, 1918.
3 SHEETS—SHEET 1.

Inventor
P. Di Benedetto

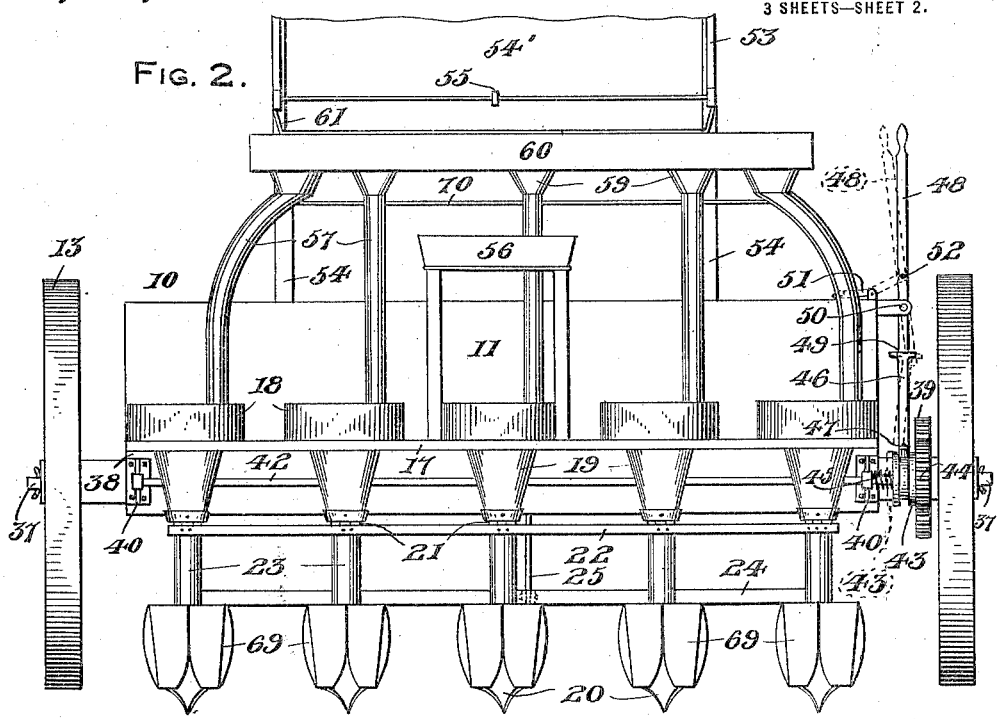
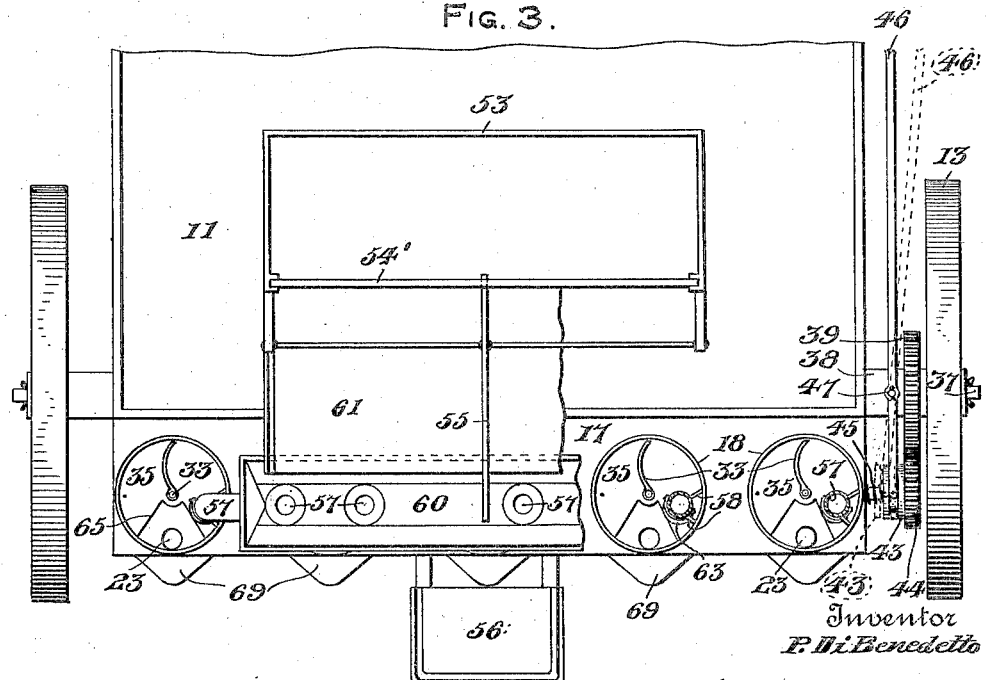

P. DI BENEDETTO.
POTATO PLANTER.
APPLICATION FILED AUG. 8, 1917.
1,275,645.
Patented Aug. 13, 1918.
3 SHEETS—SHEET 3.
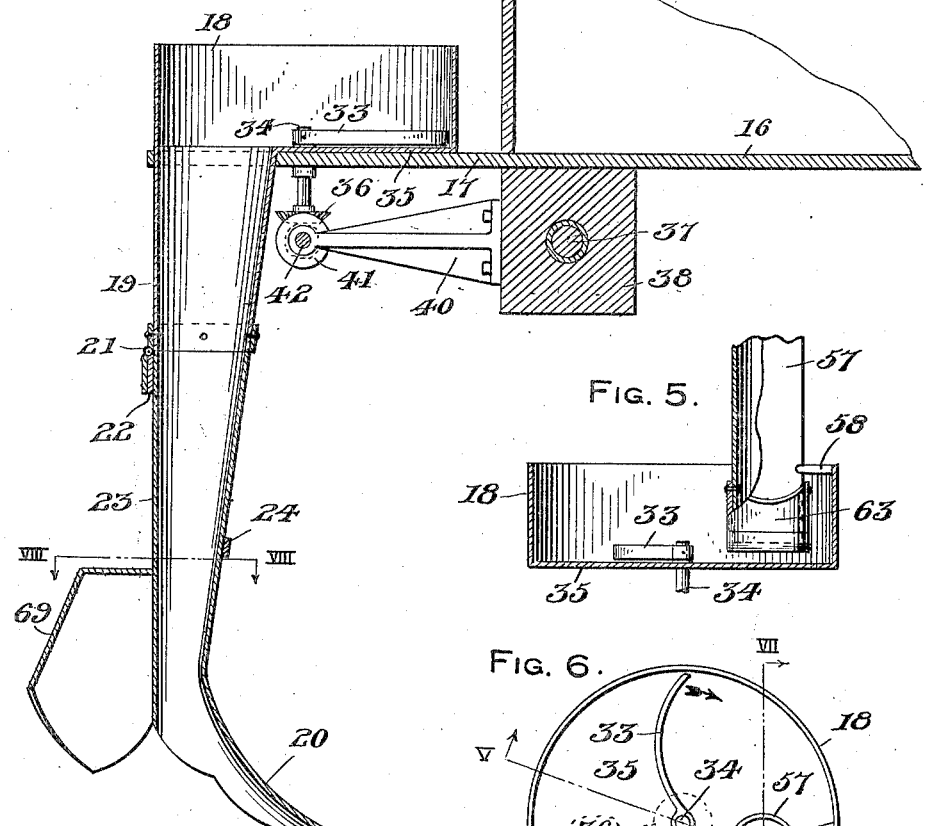
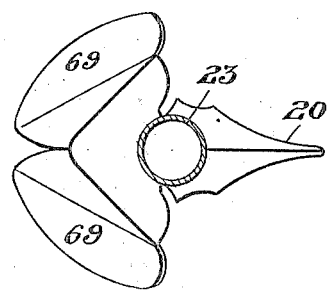
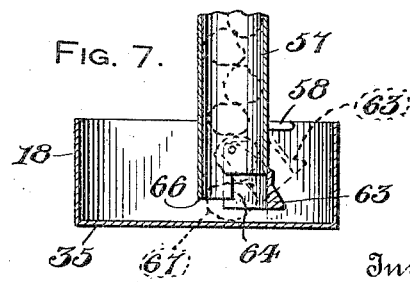
Inventor
P. Di Benedetto
By  Attorney

UNITED STATES PATENT OFFICE.

PAOLO DI BENEDETTO, OF FAIR HAVEN, VERMONT, ASSIGNOR OF ONE-FOURTH TO CHARLES RICHARD HORTEN AND ONE-FOURTH TO AUGUSTA DURI, BOTH OF FAIR HAVEN, VERMONT.

POTATO-PLANTER.

1,275,645.  Specification of Letters Patent.  Patented Aug. 13, 1918.

Application filed August 8, 1917. Serial No. 185,203.

*To all whom it may concern:*

Be it known that I, PAOLO DI BENEDETTO, a subject of the King of Italy, residing at Fair Haven, in the county of Rutland and State of Vermont, have invented certain new and useful Improvements in Potato-Planters, of which the following is a specification.

This invention relates to new and useful improvements in potato planters.

An object of this invention is to provide a potato planter with an improved hopper discharging mechanism by the use of which the planter may selectively plant and cover the seed, such as potatoes, without liability of clogging the mechanism or skipping and leaving any unplanted soil during the movement of the device to and fro over the field to be planted.

With these general objects in view and others that will appear as the nature of the invention is better understood, the same consists in the novel combination and arrangement of parts hereinafter fully illustrated and described as well as claimed.

In the drawings forming a part of this application, and in which like designating characters refer to corresponding parts throughout the several views, Figure 1 is a side elevation of the device partially broken away, Fig. 2 is a rear elevation of the same, Fig. 3 is a top plan view of the rear portion of the vehicle provided with the present device, Fig. 4 is an enlarged vertical sectional view through one of the planting devices, Fig. 5 is a vertical sectional view taken upon line V—V of Fig. 6, Fig. 6 is a top plan view of one of the hoppers, Fig. 7 is a vertical sectional view taken upon line VII—VII of Fig. 6, and Fig. 8 is a horizontal sectional view taken upon line VIII—VIII of Fig. 4.

Referring more in detail to the drawings, the device designed for rapidly planting large quantities of potatoes in a most perfect manner is herein illustrated operatively associated with a vehicle in the form of an ordinary farm wagon 10 having the usual box 11, forward wheels 12, rear wheels 13, drawing tongue 14, and driver's seat 15, the planting mechanism being arranged adjacent the rear portion of the vehicle.

The bottom 16 of the box 11 is provided with a rear extension or platform 17 formed integrally therewith or otherwise as found desirable, the same having a plurality of potato receiving hoppers 18 mounted thereon. These hoppers are in the form of shallow circular trays flatly arranged in spaced relations upon the platform 17, each of the same being provided with a depending feed-tube 19 downwardly tapered with a forwardly projecting plow 20 at its lower end for turning a furrow or trench in which the potatoes are planted. The tubes 19 are formed in two sections hinged together as at 21 while a bar 22 connects the lower sections 23 to the upper sections of the tube at the rear sides thereof and a strip 24 connects the same together upon their forward sides. An operating lever 25 is attached at its rear end to the strip 24 substantially centrally thereof and passes forwardly and upwardly through the slot 26 in the box body 16 and is arranged with a hand lever 27 at its forward end positioned conveniently adjacent the driver's seat 15 and whereby all of the tubes 19 may be rendered inoperative by the simultaneous elevation rearwardly of the lower sections 23 thereof as best illustrated by dotted lines in Fig. 1 of the drawings. A segmental rack 28 is carried by the dashboard or front wall 29 of the box 11 adapted for ratcheting engagement by the swinging pawl 30 of the lever 27 and whereby the sections 23 are maintained elevated when the lever 27 is shifted to its forward position. A similar rack 31 slightly smaller than the rack 28 is arranged adjacent thereto adapted for engagement by a pawl 32 also carried by the hand lever 27 for retaining the lever in its rear position with the tubes 19 ready for operation.

A curved potato feeding finger 33 is provided in each of the hoppers 18 mounted upon a centrally-journaled shaft 34 arranged through the bottom 35 of the hopper and also through the platform 17, bevel gears 36 being carried by the lower ends of said shafts 34. The rear axle 37 of the vehicle is journaled within a transverse bolster 38 at the rear of the wagon box 11 while a gear 39 is keyed upon the shaft 37, it being understood that the rear wheels 13 of the vehicle are rigidly secured to the said axle adapted for turning the latter during the movements of the vehicle. Rearwardly projecting brackets 40 are carried by the bolster 38 having a power shaft 42 journaled therein and upon which a plurality of beveled pinions 41 are secured in constant mesh with the beveled gears 36.

From this detailed description of the mechanism associated with the feeding fingers 33, it will be understood that the travel of the vehicle 10 revolves the shafts 34 thereby carrying the fingers 33 circuitously within the hoppers 18 and in a plane parallel to the hopper bottoms 35. It being desirable to interrupt the operative movements of the fingers 33 at certain times when it is not desired to continue the actual feeding of the seed, a clutch collar 43 is arranged upon the power shaft 42, normally connecting the gear 44 operatively therewith, a spring 45 being provided for maintaining the clutch collar in its operative position, it being understood that the gears 39 and 44 are in constant meshing engagement with each other. A releasing lever 46 engages the collar 43 at its rear end, the said lever 46 being pivoted as at 47 to the bolster 38 and having a transversely movable shifting lever 48 loosely linked thereto as at 49 and pivoted to the box 11 as at 50. It will be seen that the collar 43 being normally outwardly and operatively positioned, the upper end of the shifting lever 48 will be normally arranged at the outward limit of its travel, while upon grasping the same by the operator, the upper end of the lever 48 may be drawn inwardly thereby shifting the collar 43 inwardly and releasing the clutch whereby the movement of the vehicle will have no effect upon the fingers 33. A swinging latch 51 is carried by the box 11 for engaging a side pin 52 upon the lever 48 for retaining the latter with the clutch collar 43 released whenever it is found desirable to maintain the fingers 33 inoperative. This is desirable at such times as when the vehicle is turning at the ends of the rows which are being planted so that by forwardly moving the hand lever 27 and inwardly moving the shifting lever 48 the entire mechanism will be rendered inoperative and so maintained for any length of time desired by means of the pawls 30 and latch 51 in the manner heretofore set forth.

A reservoir 53 for the seed or potatoes is arranged in an elevated position with respect to the hoppers 18 being preferably mounted upon upright legs 54 preferably forwardly of the said hoppers, the same having a vertically sliding rear door 54' normally closed by gravity or by means of a spring, not shown, while the same may be readily opened by means of the elevating lever 55, operable by a person positioned upon the rear seat 56 carried by the platform 17. A communicating pipe 57 is provided for each of the hoppers 18, the lower ends of said pipes being secured to the hoppers by means of braces 58 while flaring funnel-shaped mouths 59 are provided at the tops of the pipes 57 sunk in the bottom of a transverse trough 60 conveniently positioned forwardly of the seat 56. An elongated feed-chute 61 projects rearwardly from the inclined bottom 62 of the reservoir 53 slightly overlying the trough 60 and whereby potatoes may be readily fed from the reservoir, through the chute 61 into the trough 60 and distributed by the hands of the operator through the mouths 59 of the pipes 57 whereby the potatoes are permitted to pass downwardly through the pipes 57 with the lowermost potatoes resting upon the bottoms 35 of the hoppers 18.

Swinging gates 63 substantially semi-circular in form are pivotally mounted diametrically of the bottoms of the pipes 57 normally overlying side cutaway portions or outlets 64 of the pipes, the gates being suitably weighted for normally maintaining the same lowered. The feed-tubes 19 communicate with the bottoms 35 of the hoppers 18 through segmental openings 65 arranged in the hopper bottoms at one side of the gates 63, the arrangement being such that the circular swinging movement of the fingers 33 brings the same beneath the bottoms 66 of the pipes 57 for engaging the lowermost potato as 67 sweeping the same past the gates 63 and into the tubes 19 through the openings 65.

In operation, it will be understood that with the mechanism in its operative positions and operators positioned upon the seats 15 and 56, the wagon 10 may be drawn forwardly by means of the tongue 14. The clutch-collar 43 being operatively arranged, the movements of the rear-wheels 13 turns the gears 39 and 44 thereby slowly revolving the fingers 33 within the hoppers 18 for positioning the potatoes one by one from the pipes 57 into the tubes 19, the travel of the potatoes from the reservoir 53 to the trough 60 and into the pipe 57 being governed by the operator upon the seat 56. The forward travel of the tubes 19 with the plow 20 positioned beneath the ground 68 forms a furrow during the forward movement of the wagon 10 into which the potatoes 67 are dropped in the manner described in suitable spaced relations while lateral wings or covering blades 69 are rearwardly carried by the tube-section 23 for covering the potatoes and closing the furrow after the potatoes are dropped in the furrow and during the continuous forward travel of the device. A transverse brace 70 is preferably arranged between the pipes 57. It will be understood that the gear ratio may be changed if desired between either the gears 39, and 44 or the pinions 36 and 42 for changing the speed with which the fingers 33 are revolved in the event that the same is found desirable for any reason incident to the perfect planting operation of the device.

A serviceable planter for potatoes and similar seed is arranged by means of which the planting operation may be completely and easily performed without the necessity of employing hand implements in any step of the operation. It will be seen that the forcing of the lower potato 67 in each tube 57 laterally of the latter and into the adjacent opening 65 by means of the fingers 33 is positive and sure, the gate 63 automatically tilting upwardly for releasing the potatoes during their movement through the cutaway portions 64 of the pipes while the gates return of their own weight to their normal positions after the release of the lowermost seed for the purpose of retaining the next adjacent potato until a reoccurrence of the operation when the fingers 33 pass beneath the pipes 57 upon the successive rotation of said fingers and their carrying shafts 34. The ground 68 being suitably prepared by plowing and harrowing permits the perfect operation of the planter, and while the present embodiment thereof is preferable, minor changes may be made without departing from the scope of the claims.

What I claim as new is:—

1. A potato planter including a platform, a shallow hopper arranged upon said platform, a potato dropping tube depending from said hopper, a potato engaging finger centrally journaled within said hopper, operating means for said finger, a potato feeding pipe having its lower outlet end arranged slightly spaced above the bottom of said hopper out of alinement with said tube, the path of movement of said finger being between said pipe and the bottom of the hopper and over said tube and a feed-controlling device for said pipe having a part lying in the path of said finger for actuating the device by the movement of the finger.

2. In a potato planter, a hopper having a bottom, a potato discharge tube depending from and communicating with the bottom of said hopper, a potato feeding pipe having its lower outlet end terminating above the bottom of the hopper and provided with a cutaway side portion, a swinging gate pivoted to said pipe and normally overlying said cutaway portion, a swinging potato moving finger arranged within the hopper and having a path of movement within the plane of said gate and between the hopper bottom and the lower end of the pipe, and means for swinging said finger.

In testimony whereof I affix my signature.

PAOLO DI BENEDETTO.

Copies of this patent may be obtained for five cents each, by addressing the "Commissioner of Patents, Washington, D. C."